United States Patent
Retallick

[19]

[11] Patent Number: 6,060,173

[45] Date of Patent: *May 9, 2000

[54] METAL HONEYCOMB BODY

[75] Inventor: William B. Retallick, West Chester, Pa.

[73] Assignee: Englehard Corporation, Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,698

[22] Filed: Apr. 12, 1997

Related U.S. Application Data

[60] Provisional application No. 60/015,796, Apr. 17, 1996.

[51] Int. Cl.$^7$ .............................. B32B 3/12; B32B 15/01; B32B 15/04; B21D 47/04

[52] U.S. Cl. ........................ 428/593; 428/594; 428/595; 428/469; 422/180; 52/793.1; 502/527.19; 502/527.22

[58] Field of Search ...................... 428/593, 594, 428/595, 544, 184, 469; 422/174, 180, 177; 502/439, 527, 527.19, 527.22; 55/492, 521, 524, 497; 29/890, 611; 52/793.1

[56] References Cited

U.S. PATENT DOCUMENTS

| | | | |
|---|---|---|---|
| 4,576,800 | 3/1986 | Retallick | 422/180 |
| 4,673,553 | 6/1987 | Retallick | 422/180 |
| 4,832,998 | 5/1989 | Cyron | 428/116 |
| 4,923,487 | 5/1990 | Bogart et al. | 55/482 |
| 5,070,694 | 12/1991 | Whittenberger | 60/300 |
| 5,328,359 | 7/1994 | Retallick | 431/326 |
| 5,336,472 | 8/1994 | Toyoda | 422/177 |
| 5,346,389 | 9/1994 | Retallick et al. | 431/7 |
| 5,374,402 | 12/1994 | Hitachi et al. | 422/177 |
| 5,384,099 | 1/1995 | Sheller | 422/174 |
| 5,395,600 | 3/1995 | Cornelison | 422/180 |
| 5,571,485 | 11/1996 | Brunson | 422/174 |
| 5,620,666 | 4/1997 | Usui | 422/171 |
| 5,785,931 | 7/1998 | Maus et al. | 422/180 |
| 5,791,044 | 8/1998 | Whittenberger et al. | 29/890 |
| 5,820,835 | 10/1998 | Sheller et al. | 422/180 |

*Primary Examiner*—Deborah Jones
*Assistant Examiner*—Michael LaVilla

[57] ABSTRACT

An improved honeycomb body having a perimeter which encloses the cross section of the honeycomb body. The honeycomb is formed by folding a strip of metal foil back and forth upon itself to provide folds, the foil having corrugations whereby the corrugations maintain the spacing between the folds. One end and only one end of each fold terminates on the perimeter of the body, the cross section of the body being completely filled with folds. The honeycomb body has increased structural and mechanical integrity and is especially useful as a catalyst support for preparing an automotive catalyst.

10 Claims, 6 Drawing Sheets

METAL HONEYCOMB BODY

This Appln. claims benefit of provisional Appln. 60/015,796 Apr. 17, 1996.

FIELD OF THE INVENTION

The present invention relates to a metal honeycomb body. In particular, this invention relates to a folded metal honeycomb body having a perimeter which encloses the cross section of the honeycomb, the honeycomb being made by folding a strip of metal foil back and forth upon itself to provide folds, the foil having corrugations whereby the corrugations maintain the spacing between the folds, one end and only one end of each fold terminating on the perimeter, the cross section being completely filled with folds.

The honeycomb of the present invention has uses in catalytic converters, preferably for automobiles, in other kinds of reactors, and as an electrical resistance heater.

BACKGROUND OF THE INVENTION

Metal honeycomb catalyst support have been proposed for converter for automobiles. One way to make a metal honeycomb is to lay a corrugated strip of metal on a flat strip of metal, and to wind the two strips upon themselves to make a spiral. Another way to make a honeycomb is to fold a strip of metal back and forth upon itself. U.S. Pat. No. 4,402,871 describes such a honeycomb. The face of the honeycomb can have any shape such as a circle or an ellipse, which is commonly used for automobile converters. These folded honeycombs are anchored in place in a metal shell or housing.

While many techniques have been used to assemble the honeycomb into the housing, many arrangements have been unable to survive severe automotive industry tests known as the Hot Shake Test, the Hot Cycling Test, combinations of these tests, cold vibration testing, water quench testing, and impact testing.

The Hot Shake test involves oscillating (50 to 200 Hertz and 28 to 80 G inertial loading) the device in a vertical, radial or angular attitude at a high temperature (between 800 and 1050 degrees C.; 1472 to 1922 degrees F., respectively) with exhaust gas from a gas burner or a running internal combustion Engine simultaneously passing through the device. If the device telescopes, or displays separation or folding over of the leading or upstream edges of the foil leaves, or shows other mechanical deformation or breakage up to a predetermined time, e.g., 5 to 200 hours, the device is said to fail the test.

The Hot Cycling Test is ran with exhaust flowing at 800 to 1050 degrees C.; (1472 to 1922 degrees F.) and cycled to 120 to 200 degrees C. once every 13 to 20 minutes for up to 300 hours. Telescoping or separation of the metal foil strips, or mechanical deformation, cracking or breakage is considered a failure.

Also, the Hot Shake Test and the Hot Cycling Test are sometimes combined, that is, the two tests are conducted simultaneously or superimposed one on the other.

The Hot Shake Test and the Hot Cycling Test are hereinafter called "Hot Tests." While they have proved very difficult to survive, the honeycomb structures of the present invention are designed to survive these Hot Tests and other tests similar in nature and effect that are known in the industry.

From the foregoing, it will be appreciated that metal honeycomb bodies having increase structural and mechanical durability and their method of manufacture are in need, particularly by the automotive industry.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

The honeycomb body of the present invention is made by folding a strip of metal foil back and forth upon itself to provide folds having two ends. The foil having corrugations which maintain the spacing between the folds. Only one end of each fold terminates on the perimeter of the honeycomb body. The cross section of the honeycomb is completely filled with folds.

Preferably, the honeycomb body has at least two segments, each segments being defined by one length of folded foil. The honeycomb body maybe joined to an outer shell or housing at its perimeter by any suitable means, but is preferably joined by brazing. The honeycomb body is characterized by increased structural and mechanical durability in shake and bake or the hot vibration test.

BRIEF DESCRIPTION OF THE DRAWINGS

The invention will be better understood by having reference to the annexed drawings showing preferred embodiments of the invention.

DETAILED DESCRIPTION OF THE INVENTION

Figures 1A, 1B, 1C:
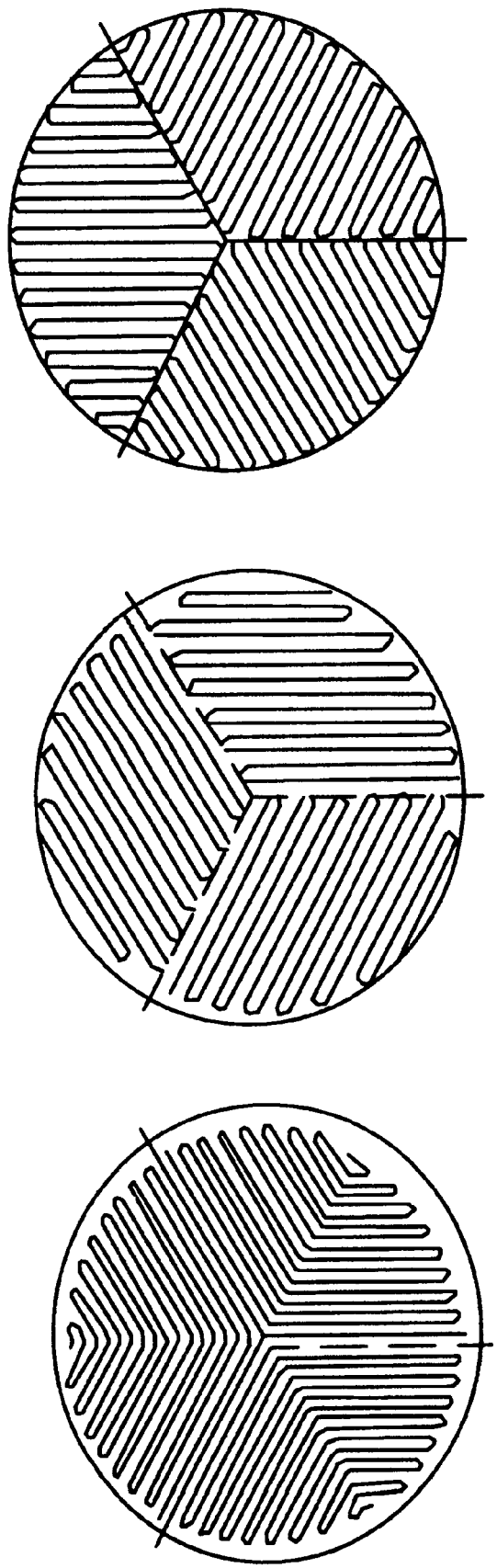
FIGS. 1A, 1B and 1C show end views of the cross section of a circular honeycomb body divided into three segments.

Some honeycombs made according to the invention will be described. FIGS. 1A, 1B, and 1C show the cross section of a circular honeycomb divided into three segments of fold foil. There can be more than 3 segments, but there must be at least two segments. Within each segment the folds are parallel to each other. The design in FIG. 1A is preferred because none of the folds are tangent to the circle. For purposes of this invention, a fold is defined as a straight length of metal foil which terminates at the end of the foil length or at a bend in the foil. Thus each chevron pattern in FIG. 1C consists of two folds.

Figure 2:
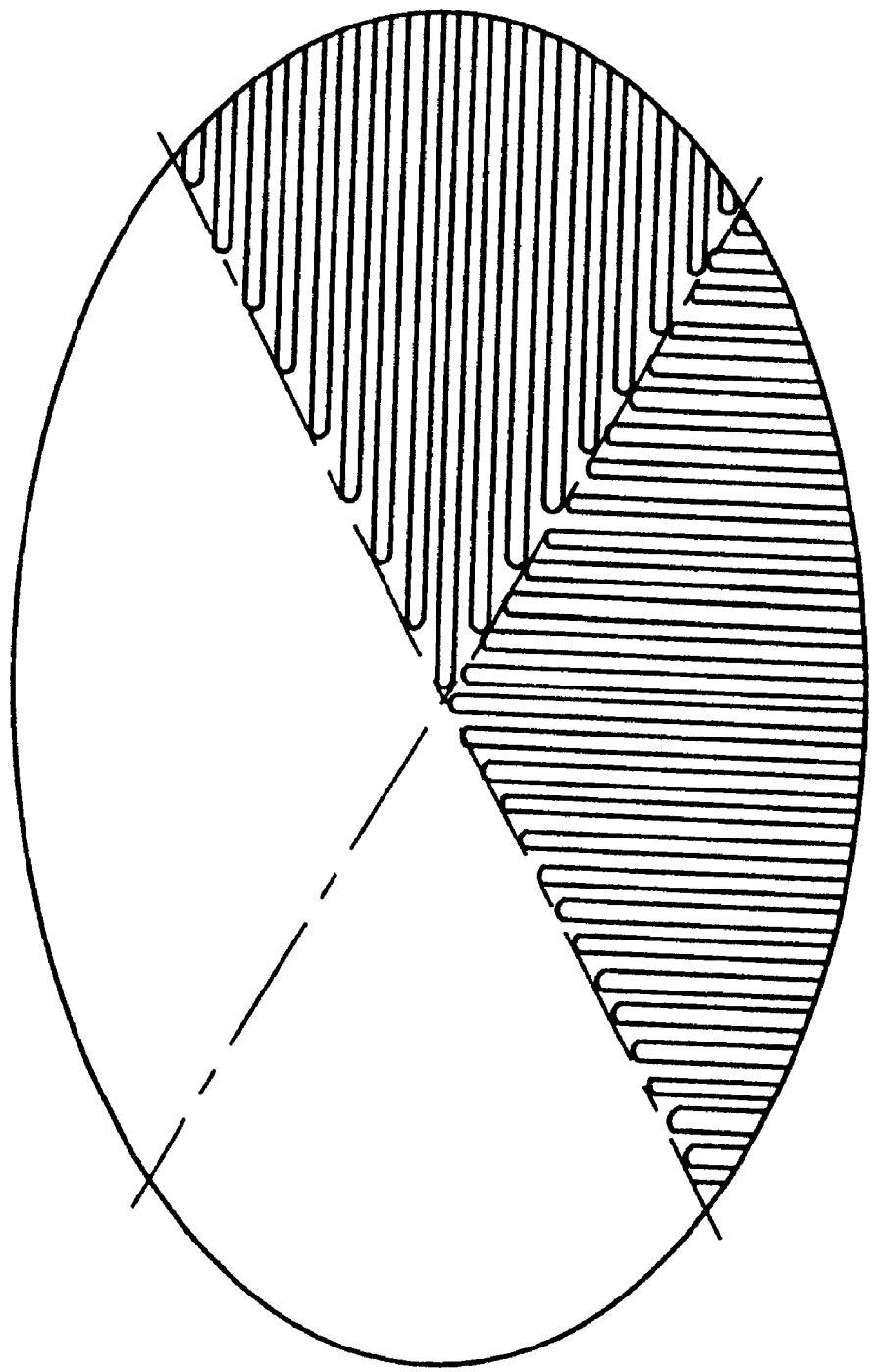
FIG. 2 shows an fragmentary end view of the cross section of an elliptical honeycomb body wherein the foil segments subtend at unequal angles.
Figure 3A:
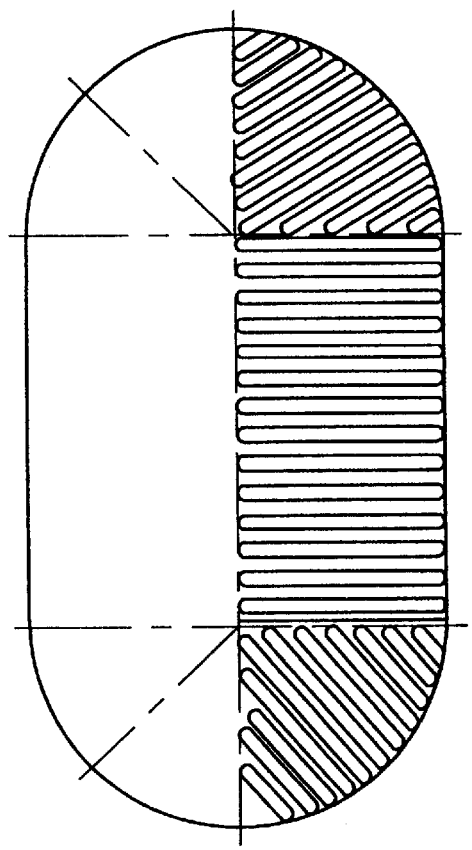
FIGS. 3A and 3B show fragmentary end views of the cross section of a race track shaped honeycomb body.
Figure 3B:
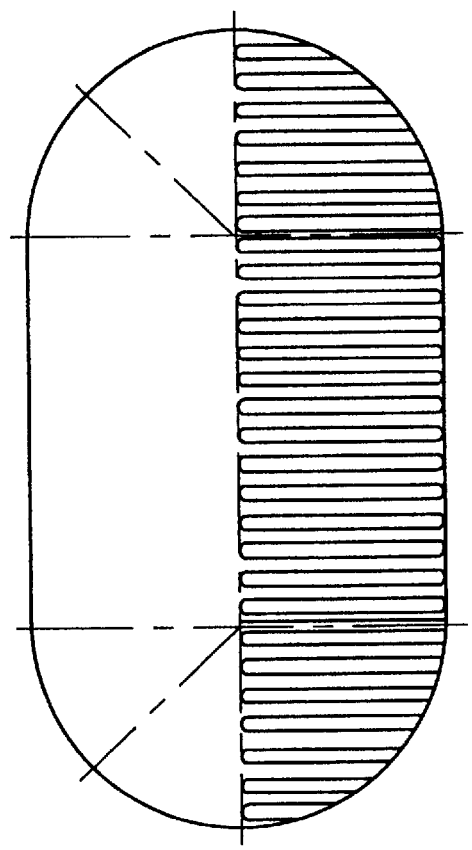
Figure 4:
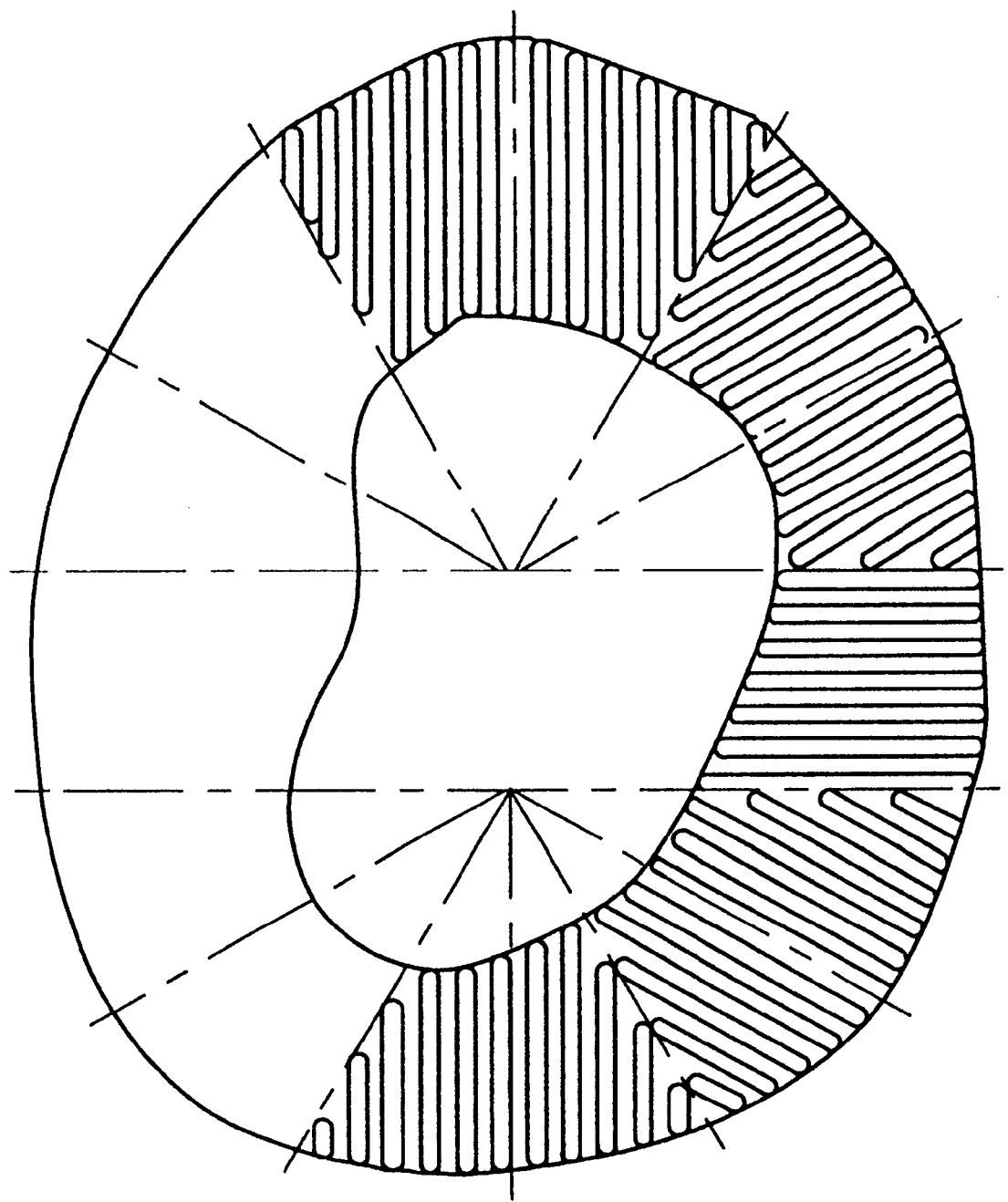
FIG. 4 shows a fragmentary end view of the cross section of a honeycomb body having an irregular perimeter and inner opening.
Figure 5A:
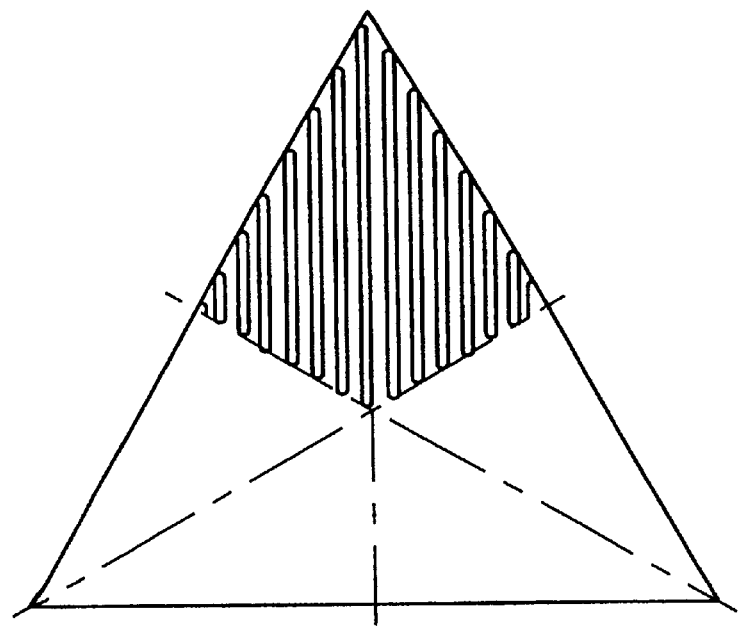
FIGS. 5A and 5B show fragmentary end views of the cross section of a triangular honeycomb body.
Figure 5B:
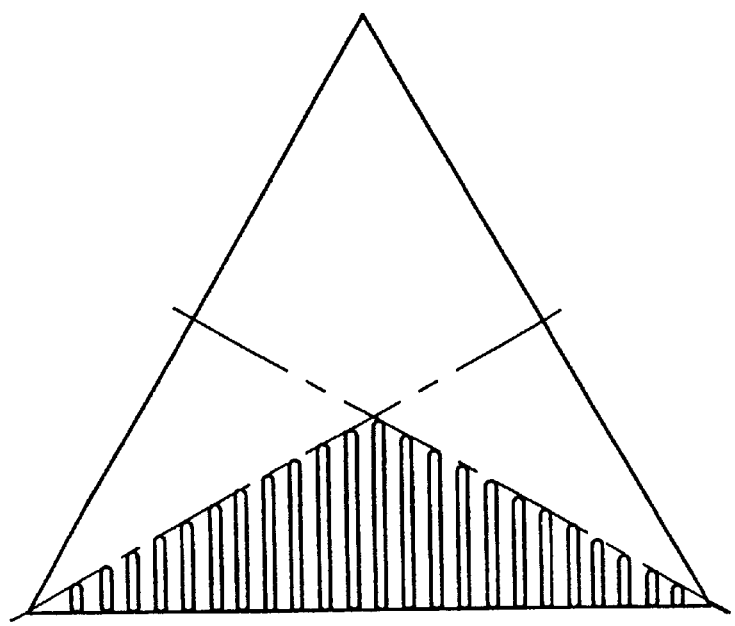

FIG. 2 shows a honeycomb that fills an elliptical cross section. The teaching here is that the segments need not subtend equal angles. FIG. 3A and 3B show two honeycombs that fill a cross section made by capping a rectangle with two semicircles. The teaching here is that the segments need not meet at a point. FIG. 4 shows a honeycomb having eight segments, an irregular perimeter, and an inner opening of irregular shape. Here again the segments do not meet at a point. The perimeter may be a physical structure such as an outer shell, or an imaginary boundary. FIGS. 5A and 5B show two honeycombs that fill a triangular cross section. Other polygons can be filled in a similar way.

An important application for the honeycomb of the invention in a catalytic converter for an automobile. Such an application requires excellent structural strength. Candidate converters are tested in what is called the shake and bake or the hot vibration test. The converter is shaken at a frequency of 100 to 200 Hertz and with an acceleration of 75 G. While the shaking is going on, the converter is cycled thermally by alternately passing combustion gas at 900° C. and ambient air. A typical test lasts 100 hours. When used in a catalytic converter, the metal honeycomb is joined, preferably by brazing, to a shell or housing that surrounds the honeycomb. No other method of anchoring the metal honeycomb has survived the shake and bake test.

U.S. Pat. No. 4,832,998 shows a current design for an automobile converter having circular cross section. The circular cross section is filled by winding a stack of strips around two fixation points that are spaced apart. The length of the strips is exactly 3 times the radius of the circle. Each end of each strip is brazed to the shell. Each strip has the rigidity of a cantilever having a length of 1.5 times the radius of the circle. In the honeycomb in FIGS. 1A and 1B, the longest cantilever has a length 1.0 times the radius of the circle. In addition, each cantilever comprises a double layer of metal foil. The honeycomb in FIG. 1A is more rigid than the honeycomb in U.S. Pat. No. 4,832,998.

Figure 6:
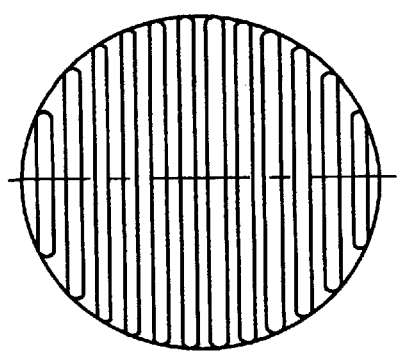
FIG. 6 shows an end view of the cross section of a circular honeycomb body having all of the folds of the foil strip parallel to the diameter of the circle.
Figure 7:
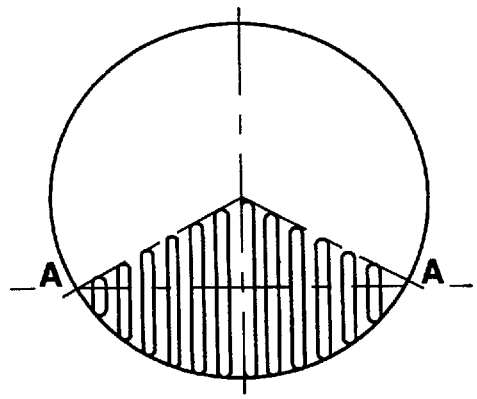
FIG. 7 shows a fragmentary end view of FIG. 1A.

Another use for this honeycomb is in reactors wherein heat must be added or removed through the shell on the perimeter of the honeycomb. The folds of foil act as fins which transfer heat to or from the shell. The fins are most effective when they are brazed to the shell. The advantage of the present honeycomb is an increased number of fins. FIG. 6 shows that when all of the folds are parallel to a diameter of the circle, each strip generates just one termination on the circle and hence just one fin. Now consider the honeycomb in FIG. 1A, redrawn in FIG. 7. The length of the chord A—A is $R \sqrt{3}$ where R is the radius of the circle. There are 3 such chords, one for each segment, so the total length of chords is $3R\sqrt{3}$. For the circle in FIG. 6 with no segments, there is just one chord, the diameter, of length 2R. Then the number of strips in the 3 segments in FIG. 7 exceeds the number of strips in FIG. 6 by a factor of $3/2 \sqrt{3}$. Only half of the strips in FIG. 7 generate a termination on the circle, so the number of terminations (the number of fins) is increased by a factor of $3/4 \sqrt{3}$. By like reasoning, with 4 segments the factor of increase is $\sqrt{2}$, and is 1.5 for 6 segments. In the limit as the number of segments becomes infinitely large, the factor of increase is $\pi/2$ or about 1.57.

Figure 8:
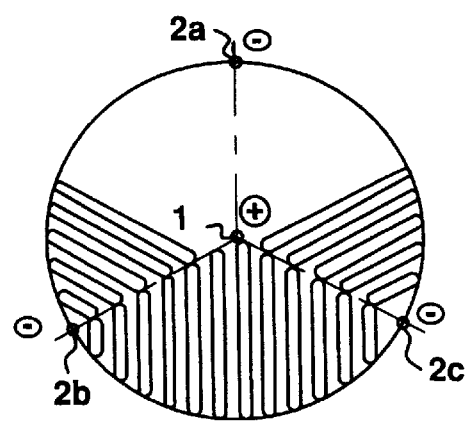
FIG. 8 shows a fragmentary end view of the connection of a circular honeycomb body to an electrical source.

The honeycomb body can also be used as an electric resistance heater. Such heaters are an essential part of the electrically heated converter for automobiles. The heater covers the upstream face of the catalyst coated honeycomb that converts the contaminants in the exhaust gas. In this application the honeycomb is relatively flat, like a pancake. It is formed from a metal strip about 8–15 mm wide. FIG. 8 shows how the resistance heater would be connected. There is an electric terminal 1 at the center of the honeycomb. The center point of the strip that forms each of the three segments is connected to the electric terminal. There are three perimeter terminals 2a, 2b and 2c of opposite sign on the perimeter, at the junctions between the segments. There are six paths in parallel for the flow of current. The advantage of so many paths in parallel is that if one path is disrupted, the others continue to work. If there were four segments instead of three, there would be eight paths in parallel. The folds of foil must be insulated from each other. This can be done with the electric barrier coating, for example, such as described in copending application U.S. Ser. No. 08/477,981.

When the honeycomb is used in a catalytic converter for an automobile, or for a chemical reactor of some other kind, the foil is coated with a catalyst. The coating is formed by first coating the foil with a suitable metal oxide, such as alumina, and then impregnating the metal oxide coating with the catalyst metal. The metal honeycomb then becomes a catalyst support.

For whatever the use, the foil must have corrugations to maintain the spacing between the folds. See for example, U.S. Pat. No. 4,576,800 and U.S. Pat. No. 5,328,359. The corrugations can be straight or they can have a herringbone shape. If the corrugations are straight, they may be inclined to the perpendicular across the strip as shown in U.S. Pat. No. 4,748,838. Such inclination is often referred to as "skew" corrugation. This ensures that when the strip is folded, the corrugation will cross over each other and maintain the spacing.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A metal honeycomb body having a perimeter and a cross section comprising at least two segments, each segment being completely filled with at least three adjacent metal foil layers, each metal foil layer having two opposite ends, being in contact with adjacent foil layers, being connected to adjacent foil layers by at least one fold and extending in a straight path over its entire length between opposite ends, said metal foil layers being formed by folding a strip of metal foil back and forth upon itself, the metal foil having corrugations whereby the corrugations maintain spacing between adjacent metal foil layers, only one end of each of the metal foil layers in a segment terminating on the perimeter of the honeycomb body.

2. The metal honeycomb body of claim 1 further including a metal shell on the perimeter of the honeycomb body.

3. The metal honeycomb body of claim 2 wherein the honeycomb is brazed to an outer shell at the perimeter of the body.

4. The metal honeycomb body of claim 1 wherein the cross section of the body is divided into at least two segments.

5. A metal honeycomb catalyst support having a perimeter and a cross section comprising at least two segments, each segment being completely filled with at least three adjacent metal foil layers, each metal foil layer having two opposite ends, being in contact with adjacent foil layers, being connected to adjacent foil layers by at least one fold and extending in a straight path over its entire length between opposite ends, said metal foil layers being formed by folding a strip of metal foil back and forth upon itself, the metal foil having corrugations whereby the corrugations maintain spacing between adjacent metal foil layers, only one end of each of the metal foil layers in a segment terminating on the perimeter of the honeycomb body.

6. The metal honeycomb catalyst support of claim 5 further including a metal shell on the perimeter of the catalyst support.

7. The metal honeycomb catalyst support of claim 6 wherein the catalyst support is brazed to the shell.

8. A reactor comprising a metal honeycomb body enclosed in a shell, the honeycomb body having a perimeter and a cross section comprising at least two segments, each segment being completely filled with at least three adjacent metal foil layers, each metal foil layer having two opposite ends, being in contact with adjacent foil layers, being connected to adjacent foil layers by at least one fold and extending in a straight path over its entire length between opposite ends, said metal foil layers being formed by folding a strip of metal foil back and forth upon itself, the metal foil having corrugations whereby the corrugations maintain spacing between adjacent metal foil layers, only one end of each of the metal foil layers in a segment terminating on the perimeter of the honeycomb body.

9. The reactor of claim 8 wherein the honeycomb body is brazed to the shell.

10. An electric resistance heater from a metal honeycomb body having a perimeter and a cross section divided into at least two segments, the perimeter enclosing the cross section of the honeycomb body, each segment of the honeycomb body being made by folding a strip of metal foil back and forth upon itself to form at least three adjacent metal foil layers, each metal foil layer having two opposite ends, being in contact with adjacent foil layers, being connected to adjacent foil layers by folds, and extending in a straight path over its entire length between opposite ends, the metal foil having corrugations whereby the corrugations maintain the spacing between the metal foil layers, only one end of each of the metal foil layers terminating on the perimeter of the honeycomb body, the cross section being completely filled with metal foil layers, the segments meeting at a point located within a central region of the honeycomb body, there being an electrical terminal at the point, one metal foil layer in each segment making electric contact with the point, there being a terminal on the perimeter at each junction between the segments, the terminal being in electrical contact with the metal foil layer on each side of the junction, the metal foil layers being coated with an electrical barrier.

* * * * *